Feb. 15, 1944.    A. J. TER LINDEN    2,341,671
CENTRIFUGAL DUST SEPARATOR
Filed Sept. 15, 1939
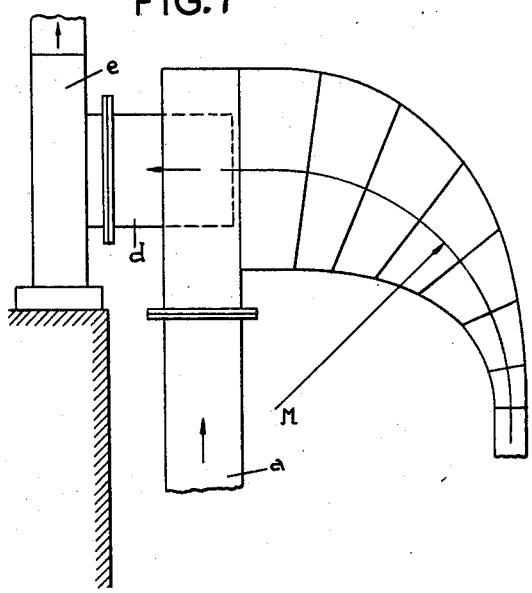
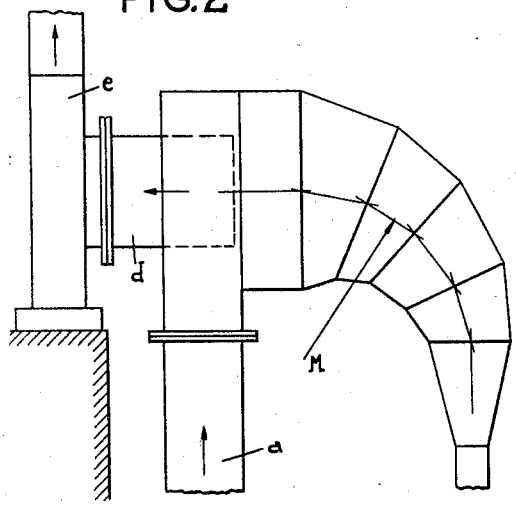
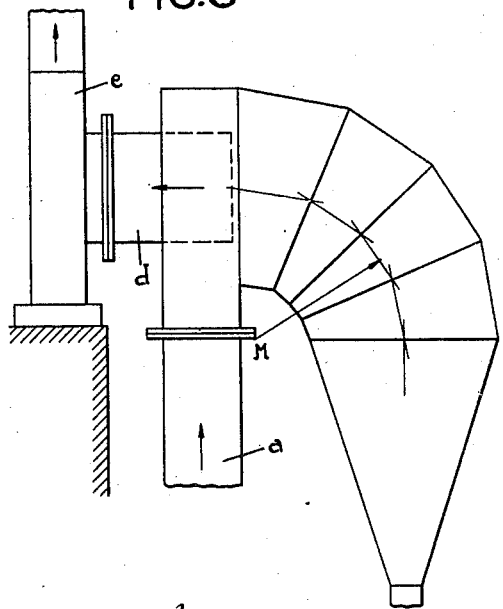
Inventor.
A. J. ter Linden
By E. F. Wendiroth atty Patented Feb. 15, 1944

2,341,671

UNITED STATES PATENT OFFICE 2,341,671

CENTRIFUGAL DUST SEPARATOR

Adam Johannes ter Linden, Delft, Netherlands; vested in the Alien Property Custodian Application September 15, 1939, Serial No. 295,140
In Germany September 22, 1938

5 Claims. (Cl. 183—80)

When a centrifugal dust separator with a tangential inlet for the gas to be cleaned and an axial outlet for the cleaned gas (a so-called cyclone) has to be connected to a conduit for the supply of the gas to be cleaned, which is not horizontally directed, two bends in the gas-path are necessary.

It is an object of the invention to improve this construction.

An object of the invention is to eliminate or reduce bends in the gas conduit, because these bends involve pressure losses. Another object is to reduce the resistance within the separator and in addition to increase the efficiency of the separator, that is to improve the separation. This reduction of the internal resistance and this increase in efficiency brought about by the invention are also obtained, when the conduit for the supply of the raw gas is horizontally directed.

With the above and other objects in view which will become apparent from the detailed description below, the invention is shown in the drawing, in which:

Fig. 1 is a side elevational view of one form of the improved construction,

Fig. 2 is a side elevational view of a modification of the invention, and

Fig. 3 is a side elevational view of a still further modification of the invention.

In the usual cyclone separator construction, the raw gas conduit is generally vertically positioned and there is a bend in such conduit which directs the raw gas to the tangential inlet of the head of the separator. The outlet for the cleaned gas extends downwardly through the head and the outlet conduit is generally again bent and connected to the usual suction blower. In the usual construction, therefore, there are two bends which cause pressure losses and the present invention is designed to reduce such pressure losses.

According to the invention the vertical axis of the cyclone is curved, the axis of the separator head being set at right angles to the conduit for the supply of raw gas, even if this conduit is not horizontal.

The bend for the connection of the separator to the raw gas conduit is thus eliminated even if the latter is not horizontal, but is inclined or vertically directed. The connection of the separator to the usual suction blower with horizontal axis is then also without a bend if the direction of the raw gas conduit is exactly vertical. If the raw gas conduit is not quite vertical, but nevertheless is considerably inclined to the horizontal, the connection to the suction blower can be effected by means of a slight bend which entails very little pressure loss. Tests have shown that the internal resistance of the separator is reduced by the bending of the axis of the body adjoining the head of the separator. It has further been determined that the bending of the axis also improves the efficiency, that is the separation of dust, as compared with the usual separator with a straight vertical axis and outlet at the bottom.

With the above principles in mind, the invention is shown as applied to three constructions illustrated in the drawing.

In Fig. 1, the raw gas conduit is shown at $a$. The conduit $a$ extends vertically and the outlet thereof is connected to the tangential inlet provided in the head of the centrifugal separator. It will be noted that the head of the separator is located in a vertical plane which corresponds to the plane in which the vertical axis of the conduit $a$ is located. This eliminates the usual bend provided in the raw gas conduit in present constructions.

The outlet $d$ for the separator has its axis positioned in a horizontal plane and is connected to the usual suction blower $e$. Such a construction eliminates the usual bend provided in the outlet conduit.

By the positioning of the elements as above described and as shown in Fig. 1, pressure losses due to the usual bends provided in the raw gas conduit and the outlet conduit are eliminated or substantially reduced.

In order to reduce the resistance within the separator itself and thereby increase the efficiency of the separator the axis of the cone of the separator is curved as shown in Fig. 1 along a radius M. The usual dust outlet is, of course, provided at the end of the cone.

In Fig. 2, a further modification is shown which is similar to the form of the invention shown in Fig. 1 with the exception that the cone instead of being curved throughout its entire extent is provided with a portion of its axis extending in a horizontal plane which is a continuation of the axis of the outlet $d$. In this case, only a portion of the cone is curved as shown.

In Fig. 3, a further modification is shown in which the head of the separator is curved along the radius M and the cone portion, strictly speaking, is disposed so that its axis extends along a vertically straight line.

The axis of the separator need not be curved only in one plane, but may be curved in several directions.

The production of the bent body of the separator can also be facilitated by making the individual sections not with curved but with straight axes, which are inclined one to the next as indicated in Figs. 2 and 3.

Among its other advantages the invention also permits considerable freedom in the general setting up of the cyclone. This applies particularly to its installation in a steam boiler-house. The separator can be arranged in any position in the boiler house even if the raw gas supply conduit is not exactly vertical as in the illustrated example. The space in the boiler house can thus be better utilised so that as well as a saving in space a saving in constructional cost may be effected.

The arrangement according to the invention can also be used when a plurality of these separators are to be connected to the outlet of one vertical conduit for the gas to be cleaned.

I wish it to be understood that I do not desire to be limited to the exact details of construction shown and described, for obvious modifications will occur to a person skilled in the art.

I claim:
1. A cyclone dust separator comprising a head having a raw gas tangential inlet, a conduit located axially of said head serving as an outlet for the cleaned gas, a cone having a converging body connected to said head, said cone having a dust outlet and the axis of said cone being curved throughout a substantial portion thereof.

2. A cyclone dust separator as set forth in claim 1 wherein the axis of said cone is curved so as to extend in two planes at an angle to one another.

3. A cyclone dust separator as set forth in claim 1 wherein said cone is constructed from a plurality of successive sections.

4. A cyclone dust separator as set forth in claim 1 wherein said cone is constructed from a plurality of successive frusto-conical sections.

5. A cyclone dust separator as set forth in claim 1 wherein said cone is constructed from a plurality of successive sections, each of such sections having an axis lying in a straight line and the axis of each section being inclined to the axes of adjacent sections.

ADAM JOHANNES ter LINDEN.